Figure 1:
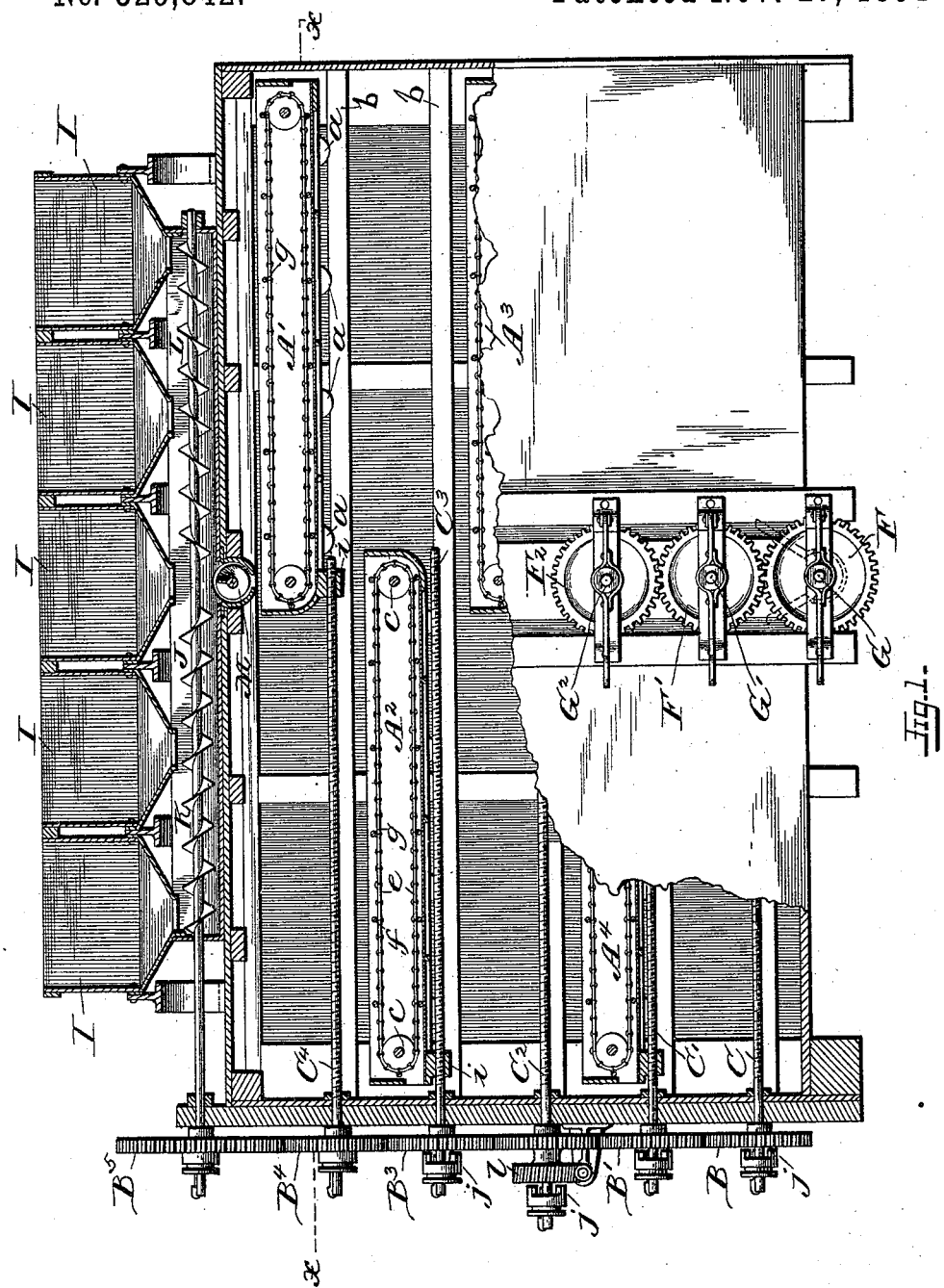

(No Model.) 3 Sheets—Sheet 1.

A. SCHULTZ.
MALTING MACHINE.

No. 529,842. Patented Nov. 27, 1894.

Witnesses—
J. Thomson Cross
Bernard J. Hanfeld

Inventor—
Adam Schultz
by Chas. M. Peck
his Atty.

(No Model.) 3 Sheets—Sheet 2.
A. SCHULTZ.
MALTING MACHINE.
No. 529,842. Patented Nov. 27, 1894.
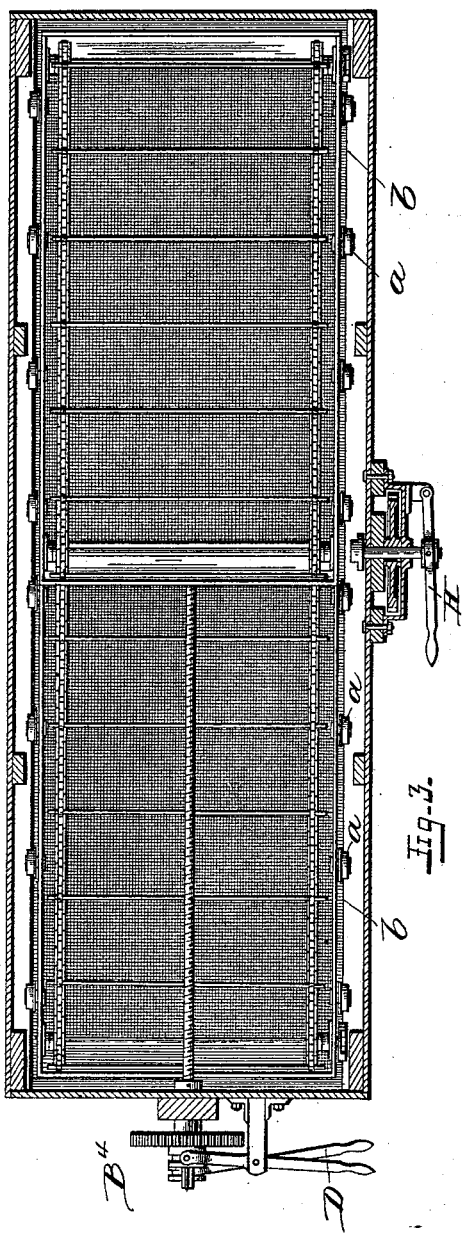
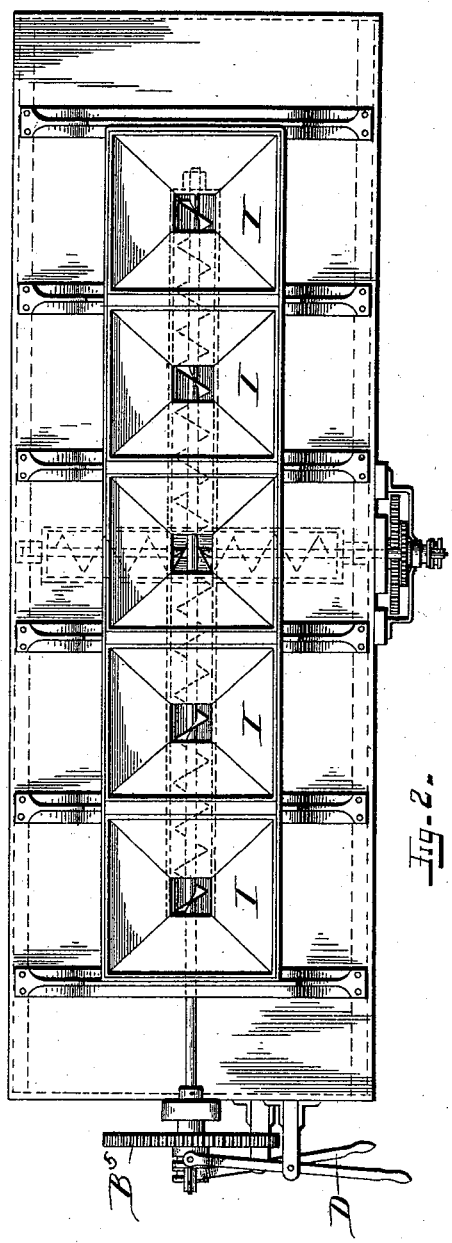

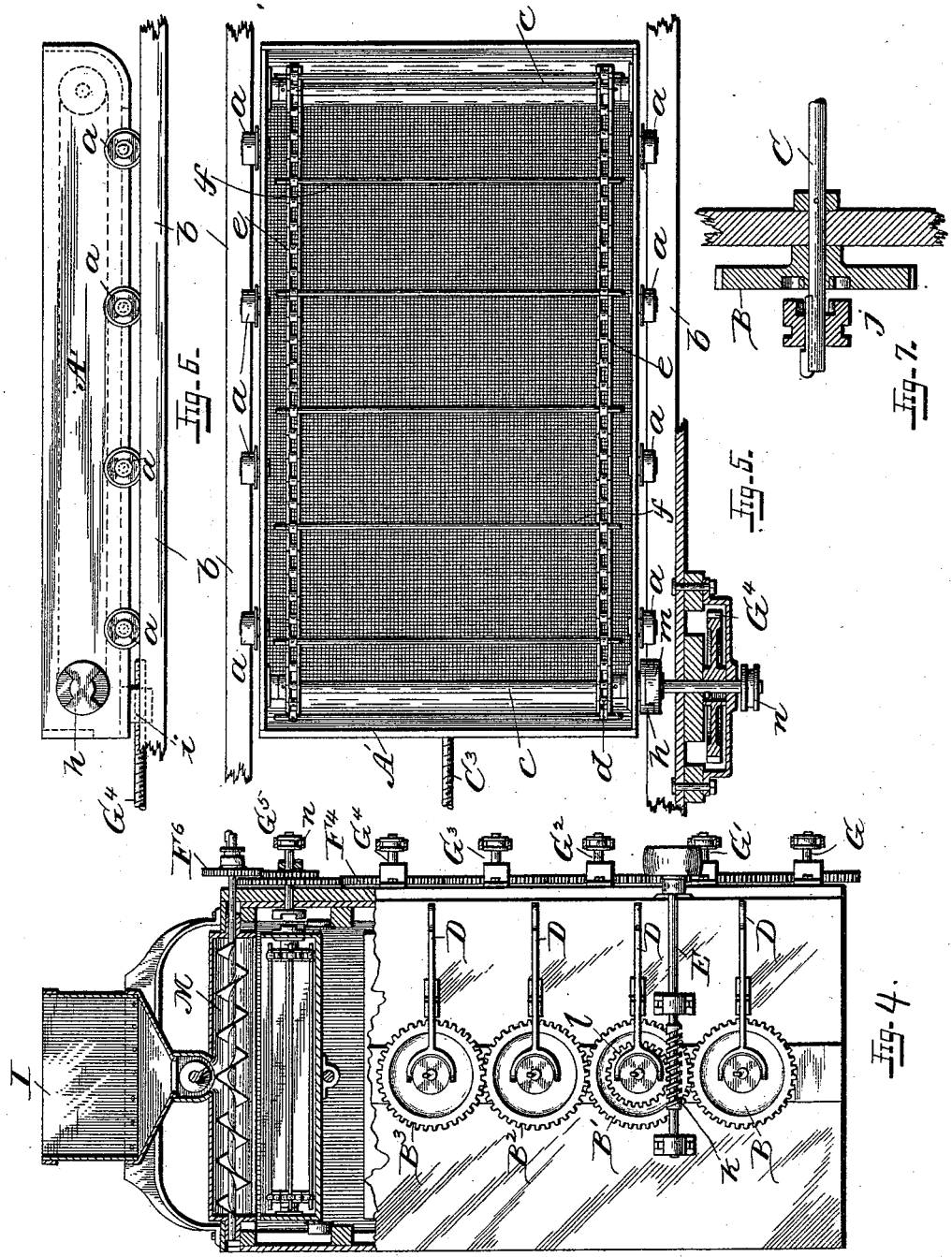

UNITED STATES PATENT OFFICE.

ADAM SCHULTZ, OF CINCINNATI, OHIO, ASSIGNOR OF ONE-HALF TO JOHN DECK, OF SAME PLACE.

MALTING-MACHINE.

SPECIFICATION forming part of Letters Patent No. 529,842, dated November 27, 1894.

Application filed August 7, 1893. Serial No. 482,599. (No model.)

*To all whom it may concern:*

Be it known that I, ADAM SCHULTZ, a citizen of the United States, residing at Cincinnati, in the county of Hamilton and State of Ohio, have invented certain new and useful Improvements in Malting and Malt-Drying Machines, of which the following is a full, clear, and exact description, reference being had to the accompanying drawings, forming part of this specification.

So far as I am aware, my invention relates to an entirely new class of machines for the production of malt whereby I am enabled to handle the grain in continuous and large quantities first to produce the malt and afterward to dry it in another machine having the principal characteristics of the first ready for use in brewing or mash making.

The novelty of my invention will be hereinafter set forth and specifically pointed out in the claims.

In the accompanying drawings:—Figure 1, Sheet 1, is a side elevation partly in section of a machine embodying my invention. Fig. 2, Sheet 2, is a plan view of the machine of Fig. 1. Fig. 3, Sheet 2, is a sectional plan view on the dotted line $xx$ of Fig. 1. Fig. 4, Sheet 3, is an end elevation of the machine partly in section looking from the left of Figs. 1, 2 and 3. Fig. 5, Sheet 3, is an enlarged plan view partly in section of one of the movable troughs and associated mechanisms. Fig. 6, Sheet 3, is a side elevation of Fig. 5, omitting the driving mechanism. Fig. 7, Sheet 3, is an enlarged sectional detail of one of the clutch mechanisms.

The same letters of reference are used to indicate identical parts in all the figures.

In any suitable rectangular frame work I mount a series of horizontal troughs, A', A², A³, A⁴, and so on, whose length is slightly greater than the length of half of the frame work as seen in Fig. 1. These troughs are in layers, one above the other and in the initial position of rest the trough A' is in the top line to the right. The trough A² is in the second line to the left. The trough A³ is in the third line to the right and so on down through the series. The trough A', has its end at the center of the frame work closed and its opposite end open and this is true of the other troughs of the series when they occupy the positions shown in Fig. 1.

For the germination of the malt the bottom of each trough is composed of glass or enameled tiling, while for the drying of the germinated malt the bottoms of the troughs are of wire gauze or perforated metal. Each trough is supported on pivoted rollers $a$ which travel on the side rails $b$ of the frame work, as shown, and mounted in each trough is a discharging rake composed of a shaft $c$ journaled transversely at each end of the trough and carrying sprocket wheels $d$ over which pass drive chains $e$ to which are secured transverse raking bars $f$ Fig. 1. Upon the end of the shaft $c$ at the open end of the trough is one part $h$ of a clutch. Upon one end of the frame work of the machine is a vertical train work of intermeshing gears B B', B², B³ and so on, one for each trough and mounted loosely on a screw shaft C, C', C², C³ and C⁴ respectively. The screw shafts are suitably journaled longitudinally of the frame work and at the middle of the troughs, and each engages a nut $i$ on the under side of its trough. Feathered on the outer end of each of the screw shafts is one part $j$ of a clutch which is adapted to engage a similar part of a clutch on the hub or face of the gears B, B', B², and so on, and these clutches are thrown into or out of engagement by pivoted hand levers D, Figs. 2, 3 and 4, having forked ends engaging circumferential grooves in the feathered clutch parts $j$. Any suitable means may be employed for driving the gears B, B', and so on, and in this instance I have shown them driven from a worm shaft E, whose worm $k$ engages a worm-wheel $l$ on the hub of the gear B'.

On one side of the frame work at the middle is a similar train of intermeshing gears F, F', F², and so on, feathered on stub shafts G, G', G², and so on, whose inner ends have fast thereon one part $m$ of a clutch to engage the other part $h$ on the shaft $c$ of the adjacent trough, while their outer ends have circumferentially grooved collars $n$ engaged by the forked ends of pivoted hand levers H for sliding the stub shafts in or out to engage or disengage the clutch parts $m$ and $h$.

Extending over the top of the frame is a series of steeping vats or bins I, Figs. 1, 2 and 4, opening by means of suitable gates into a conveyer trough J, containing a conveyer shaft driven by the gear $B^5$ and having two flights of conveyers K, L extending under the vats and both discharging at the center of the machine into a transverse right and left conveyer M whose trough has an opening at its bottom extending its entire length. The conveyer M is driven by a gear $F^6$ meshing with the train of gears F, F′ and so on.

The operation of the machine thus constructed to secure the germination of the grain is as follows: The grain is properly steeped in the vats I, each of which contains just a sufficient charge for one trough and is discharged by the conveyers K, L and M evenly into the trough A′. As soon as the conveyers begin to discharge the grain the clutch $j$ of screw shaft $C^4$ is thrown into engagement with the gear $B^4$ thereby locking the shaft to said gear which, acting on the nut $i$ of the trough A′ draws it slowly to the left so that the grain is deposited to an even depth the whole length and width of the trough. When this action has taken place, trough A′ will be directly over trough $A^2$ and the clutch $h$ of the rake mechanism will be opposite the clutch $m$. After the grain has remained a sufficient time upon the floor of trough A′, trough $A^2$ is set in motion slowly to the right and clutch $m$ is thrown into engagement with clutch $h$ of trough A′, thereby starting the rake of said trough into operation which gradually feeds out the contents of trough A′ into trough $A^2$. In like manner the remaining troughs are operated to convey the germinating grain from the top to the bottom of the machine without the necessity of injurious handling and enabling a large quantity to be worked in a short time. Any suitable fan, not shown is employed to force out the impure air. Whenever any trough is emptied it is shifted back to its original position by reversing the direction of revolution of the gears B, B′ and so on in any suitable manner.

For drying the germinated malt, the machine has to be cased in and the floors of the troughs, instead of being solid and of glass or equivalent material are of woven wire or perforated metal, and heated air is drawn through the machine in any suitable way to dry the malt. In all other respects, the construction and mode of operation are the same. Instead of screw shafts for operating the troughs any other suitable means might be employed. The malt is discharged from the lowermost trough into a conveyer box provided with a suitable conveyer for taking it away from the machine.

Having thus fully described my invention, I claim—

1. In a malting machine, the combination of a series of horizontally movable troughs, means for operating the same, and a horizontally revoluble discharge rake for each trough carried thereby and arranged to discharge its contents into the next lower trough as the latter moves under its open end, substantially as described.

2. In a malting machine, the combination of a series of vats or bins, a double conveyer extending longitudinally of the same, a transverse conveyer at the middle of the former, a series of horizontal movable troughs beneath said conveyers, means for operating the same, and a discharge rake for each trough, substantially as described.

3. In a malting machine, the combination of a series of horizontal movable troughs, rotary discharging rakes for each trough each provided with one part of a clutch, and a series of sliding clutches any one of which is adapted to be engaged with the clutch of its adjacent rake when the trough is in proper position, substantially as described.

ADAM SCHULTZ.

Witnesses:
J. THOMSON CROSS,
BERNARD J. HAUSFELD.